United States Patent
Sutter et al.

(10) Patent No.: US 8,667,135 B1
(45) Date of Patent: *Mar. 4, 2014

(54) DETECTING AND REPORTING ON CONSUMPTION RATE CHANGES

(71) Applicant: Quantcast Corporation, San Francisco, CA (US)

(72) Inventors: Paul G. Sutter, Seattle, WA (US); Konrad S. Feldman, New York, NY (US)

(73) Assignee: Quantcast Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/858,539

(22) Filed: Apr. 8, 2013

Related U.S. Application Data

(63) Continuation of application No. 13/692,042, filed on Dec. 3, 2012, now Pat. No. 8,438,280, which is a continuation of application No. 12/829,643, filed on Jul. 2, 2010, now Pat. No. 8,386,601.

(60) Provisional application No. 61/224,841, filed on Jul. 10, 2009.

(51) Int. Cl.
*H04N 7/10* (2006.01)

(52) U.S. Cl.
USPC .............. 709/224; 705/14.51; 705/14.52

(58) Field of Classification Search
USPC .............. 709/224; 705/14.51, 14.52, 14.53
See application file for complete search history.

(56) References Cited

U.S. PATENT DOCUMENTS

| | | | | |
|---|---|---|---|---|
| 6,016,509 A * | 1/2000 | Dedrick | | 709/224 |
| 6,513,032 B1 * | 1/2003 | Sutter | | 1/1 |
| 7,542,929 B2 * | 6/2009 | Hanks et al. | | 705/26.2 |
| 8,112,550 B2 * | 2/2012 | Wilson | | 709/248 |
| 8,364,829 B2 * | 1/2013 | Mogul et al. | | 709/229 |
| 2002/0040395 A1 * | 4/2002 | Davis et al. | | 709/224 |
| 2006/0195441 A1 * | 8/2006 | Julia et al. | | 707/5 |
| 2007/0156887 A1 * | 7/2007 | Wright et al. | | 709/224 |
| 2008/0281708 A1 * | 11/2008 | Deal | | 705/14 |
| 2009/0327076 A1 * | 12/2009 | Sinyagin et al. | | 705/14.53 |

FOREIGN PATENT DOCUMENTS

WO  WO 2008144530 A2 * 11/2008 ............. G06Q 10/00

* cited by examiner

*Primary Examiner* — Kostas Katsikis
(74) *Attorney, Agent, or Firm* — Fenwick & West LLP

(57) ABSTRACT

A method, system and computer readable storage medium for reporting on a measured change in a consumption rate. Media consumption histories for a plurality of entities are received. A monitored audience is selected from the plurality of entities by selecting entities which have completed an online purchase. A category value for each of two or more categories of media content is determined. One category of media content includes one or more items of media content. One category value represents the measured change in consumption rate for one category of media content for the monitored audience between at least two time intervals. One consumption rate is determined based on the number of times each item of media content in the one category has been delivered over a network during one time interval. A report including a reference to two or more categories and their associated category values is generated.

17 Claims, 8 Drawing Sheets

Report 700:
Interval 1: 8-9AM
Interval 2: 10-11AM

| Website URL | Consumption Rate 8-9AM | Consumption Rate 10-11AM | Consumption rate change |
|---|---|---|---|
| www.url1.com | 0 visitor/hour | 100,000 visitors/hour | 50,000 visitors/hour/hour |
| www.url2.com | 10,000 visitors/hour | 90,000 visitors/hour | 40,000 visitors/hour/hour |
| www.url3.com | 1,000 visitor/hour | 80,000 visitor/hour | 39,500 visitors/hour/hour |

FIG. 7

Report 800:
Interval 1: 8-8:10AM
Interval 2: 11-11:10AM

| Webpage URL | Consumption Rate 8AM | Consumption Rate 11AM | Consumption rate change/3 hour period |
|---|---|---|---|
| www.url1.com/newsstory1 | 0 visitor/10 minutes | 15,000/10 minutes | - |
| www.url2.com/currentevent | 150/10 minutes | 10,000/10 minutes | 6667% |
| www.url3.com/gossip | 1,500/10 minutes | 9,000/10 minutes | 600% |

FIG. 8

Report 900:
Monitored Audience: Purchased movie tickets online within the last 6 months
Each category represents a set of media content items.

| Media Content Category | Average Consumption Rate Weekday | Average Consumption Rate Weekend | Consumption rate change |
|---|---|---|---|
| Viewed Video Preview of New Horror Movie with sound on at least 50% | 20,000/day | 200,000/day | 10x |
| Movie Time Postings for New Horror Movie | 5,000/day | 100,000/day | 20x |
| Viewed Gossip pages featuring news about star of New Horror Movie | 70,000/day | 5,000/day | .07x |

FIG. 9

Report 1000

Archetypical Audience: Purchased Shoe style 123 from online shoe store
Interval 1: 12/25/2009 8AM-9AM
Interval 2: 1/1/2010 8AM-9AM

| Media Content Listed in order of Top Consumption rate change by Similar Audience for media content with an average audience of at least 10,000 unique visitors/day |
|---|
| URL1 |
| URL2 |
| URL3 |

DETECTING AND REPORTING ON CONSUMPTION RATE CHANGES

CROSS-REFERENCE TO RELATED APPLICATIONS

This application is a continuation of U.S. patent application Ser. No. 13/692,042 filed on Dec. 3, 2012 by Sutter et al., entitled "Detecting and Reporting on Consumption Rate Changes" which is a continuation of U.S. patent application Ser. No. 12/829,643 filed on Jul. 2, 2010 by Sutter et al., entitled "Detecting and Reporting on Consumption Rate Changes", now U.S. Pat. No. 8,386,601 issued on Feb. 26, 2013, which claims priority from U.S. Provisional Application No. 61/224,841 filed on Jul. 10, 2009 by Sutter et al., entitled "Tracking Networked Media Content Consumption", all of which are herein incorporated by reference.

FIELD OF INVENTION

The invention relates to detecting and reporting changes to networked media content consumption rates.

BACKGROUND OF INVENTION

Search Engine Operators index networked media content such as websites and/or online videos using a variety of methods. In some cases, new networked media content, such as an online article reporting on current news events, might not be indexed immediately resulting in delayed inclusion in online search results. In other cases, important changes in consumption behavior, audience size and/or audience profile for a networked media content provider, such as a website may have low visibility.

What is needed is a system and method for reporting on changes in networked media content consumption rates and patterns.

BRIEF SUMMARY OF THE INVENTION

Embodiments of the invention provide a computer-implemented method of media content consumption reporting. Media consumption histories for a plurality of entities are received. A reporting system analyzes the media consumption histories. Media content which experienced a change in consumption rate between at least two time intervals is selected. A report including a reference to the selected media content is provided.

An embodiment of the invention provides a computer-implemented method of media content consumption reporting. Media consumption histories for a plurality of entities are received. At least one media consumption criterion including a consumption event describing exposure to advertising content is identified and a monitored audience of entities is selected from the plurality of entities by selecting entities with a media consumption history satisfying the media consumption criterion. The media consumption histories of the monitored audience are analyzed to identify selected media content, such as a web page, with a detected change in consumption rate by the monitored audience between two time intervals. A report including a reference to the selected media content is provided.

BRIEF DESCRIPTION OF DRAWINGS

FIG. 7 illustrates an example report;

FIG. 8 illustrates an example report;

FIG. 9 illustrates an example report; and

FIG. 10 illustrates an example report.

DETAILED DESCRIPTION OF THE INVENTION

Figure 1:
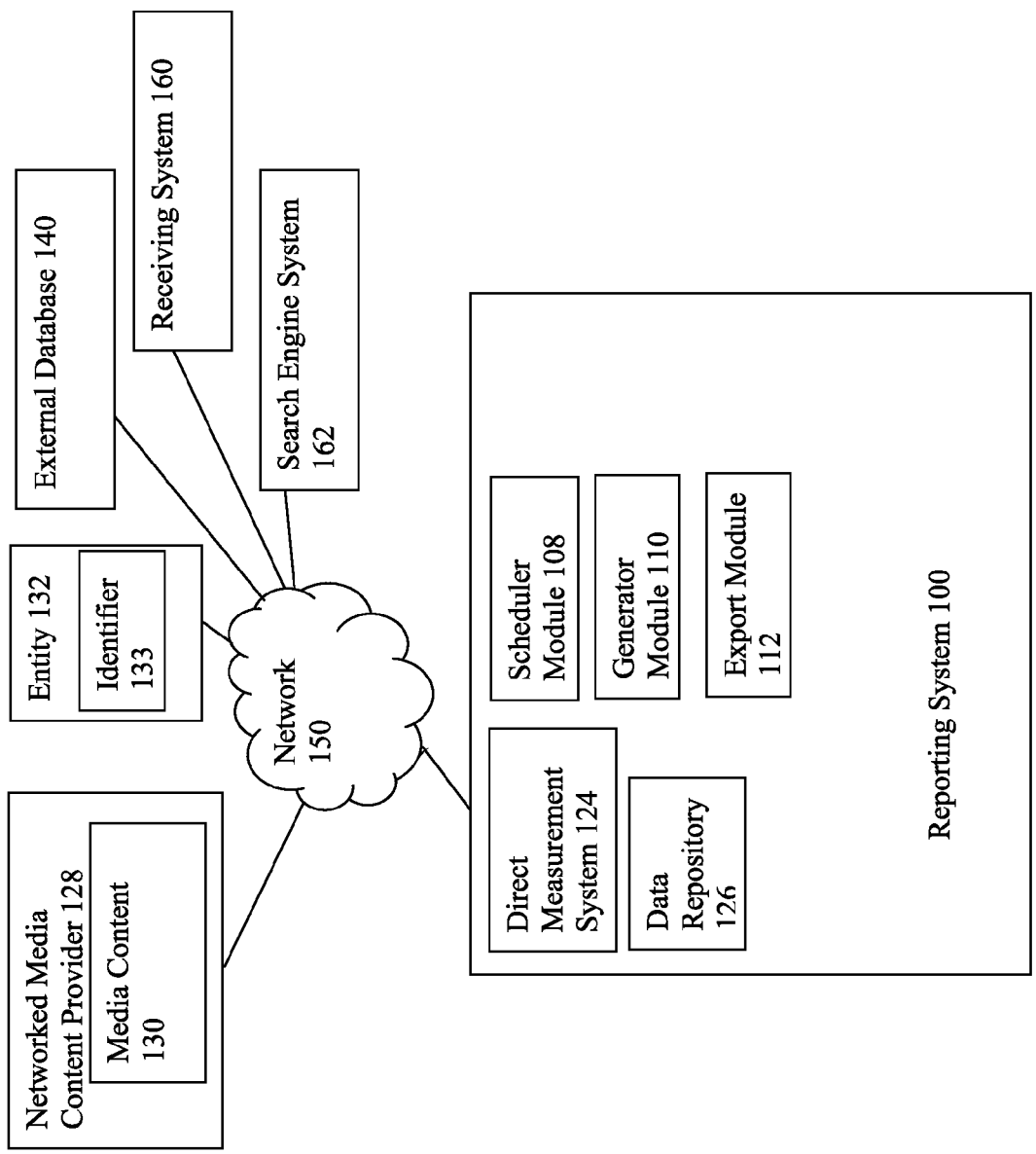
FIG. 1 illustrates an embodiment of a hardware environment for implementing the present invention.

FIG. 1 illustrates an example computing environment in accordance with an embodiment. As shown in FIG. 1, the computing environment includes a reporting system 100, at least one networked media content provider 128, at least one entity 132 and a receiving system 160. These elements are connected by a communication network 150, such as a local area network, a wide area network, a wireless network, an intranet, a cable network, a satellite network, a cellular phone network, an optical network, the Internet or combinations thereof.

Networked media content provider 128 provides media content 129 over the communication network 150 to entity 132. Examples of networked media content provider 128 can include web site operators and cable television operators. Examples of media content 130 can include, but are not limited to, a webpage, a portion of an online video clip, a portion of a networked television program, an online advertising exposure, a portion of a cable television program, a portion of a satellite television program, a portion of an Internet Protocol (IP) television program, a portion of an online audio clip, advertising content and interfaces for making online purchases and/or combinations thereof. In some examples, the media content 130 can be provided based on a request to the networked media content provider 128; in some examples, the networked media content provider 128 can push the media content 130. Although only one networked media content provider 128 is shown in FIG. 1 for clarity, any number of networked media content providers in any number of domains may be connected to the communication network 150.

In various embodiments, entity 132 receives media content 130 from networked media content provider 128 over the communication network 150. Examples of entities can include consumers, software installations or hardware devices used to access media content over a network or combinations thereof. A consumer is a person or group of people who access media content over a network. Software installations can include a web browser instance, video viewer instance or set-top box software residing on a hardware device. A hardware device can comprise a computer, personal digital assistant (PDA), cell phone or set-top unit (STU) such as a STU used in conjunction with cable television service. In some cases, an entity 132 can comprise a combination of entities which are logically grouped together to represent individuals, households or groups of individuals who access media content over a communication network. Although only one entity 132 is shown in FIG. 1 for clarity, any number of entities may be connected to the communication network 150.

As shown in the embodiment of FIG. 1, entity 132 contains identifier 133. Identifier 133 can be used to identify the entity 132. For example, a hardware device identifier such as a Media Access Control Address (MAC address) can be stored on a device. A software identifier such as a cookie value can be stored locally. In another embodiment, identifiers used to identify entities can be composed and/or stored remotely from an entity.

FIG. 1 illustrates an embodiment of a hardware environment for implementing the present invention. As shown in FIG. 1, the hardware environment includes a reporting system 100. The reporting system 100 can be coupled to the communication network 150 and can execute an operating system. The reporting system 100 can run software such as software modules direct measurement system 124, data repository 126, scheduler module 108, generator module 110 and export module 112.

In an embodiment, direct measurement system 124 collects and/or receives information for an entity 132 in conjunction with an identifier 133. For example, a direct measurement system 124 can collect information associated with entities 132 such as individual Internet browser installations used to browse the Internet. When an entity 132 requests content from a networked media content provider 128, such as a request from a web browser operating on a personal computer to display the content of a web page of an online publisher, the networked media content provider 128 can re-direct the entity 132 to submit a pixel request to the direct measurement system 124. Based on the pixel request, and optional subsequent actions and/or interactions, the direct measurement system 124 can collect and/or receive information from the entity 132 and/or information associated with the entity 132. Information is collected and/or received in conjunction with an identifier in order to maintain a coherent body of information for an entity over time. The identifier can comprise identifier 133 stored on the entity and/or an identifier stored and/or composed remotely from the entity.

Information can include a media consumption history for an entity 132, such as records of media content consumption events and attribute values. In some cases, the context of media content consumption event, such as the duration and/or quality of the consumption event, can be part of the media consumption history. For example, information associated with the hardware and/or software volume settings during the delivery of an audio advertisement can be collected and become part of the media consumption history. In some cases, the media consumption history associated with an entity 132 can be associated with actions and/or interactions with the networked media content such as bookmarking and/or copying a portion of the media content. For an entity that is a physical device, information can describe a hardware and/or software configuration.

Attribute values can comprise known, collected, received, cross-referenced, inferred, estimated, processed and/or calculated information related to an entity 132 which is not part of a media consumption history. The estimated household size associated with an entity 132 and the average household income for the zip code associated with an entity 132 are examples of attribute values. In some cases, attribute values can be assessed or described using probabilities. For example, an attribute value can reflect that there is a 90% chance that the household income for a family group owning an entity earns between $75,000 and $100,000 per year. In some cases, information can be received and processed into a processed attribute value. For example, attribute values can comprise information which has been statistically obfuscated to address privacy concerns.

In an embodiment, information collected and/or received by the direct measurement system 124 is stored in data repository 126. In some cases, information collected and/or received by the direct measurement system 124 can be processed before it is stored in data repository 126. Advantageously, a sudden increase in the consumption rate of media content 130 over a network 150 can indicate the emergence of a popular trend or news story. A change in a consumption rate, such as a decrease in a consumption rate to zero or near zero, can indicate broken links and/or an expired web page.

In an embodiment, reporting system 100 analyzes media consumption histories, such as the information in the data repository 126, to identify selected media content for reporting based at least in part on measured changes in a media content consumption rate between at least two time intervals.

Reporting system 100 comprises a generator module 110 for detecting and/or calculating changes to networked media content consumption rates by accessing and analyzing the media consumption histories for a plurality of entities, such as entity 132, from data repository 126. A media content consumption rate is measured over a time interval. For example, the number of entities which have downloaded selected content, such as a specific video, can be counted over a time interval such as an hour. The resulting content consumption rate can be represented in consumption events per time interval (900 downloads per hour); alternately, content consumption rates can be represented in average consumption events per unit time (900 downloads measured in one hour can be represented as an average of 15 downloads/minute). In another example, consumption rates can be represented in terms of the storage size of the received media content (3 Megabits/minute) and/or event duration (a 10 minute video displayed in its entirety 1000 times in an hour can be represented as 10,000 video minutes displayed/hour). A change in media consumption rates can be represented as a change in the total number of consumption events per unit of time (or per time interval); in another example, a change in media consumption rates can be represented as a change in the average number of consumption events per unit of time (or per time interval), or the percentage change in the number of consumption events per unit of time (or per time interval). In another example, a change in consumption rate can be represented as a change in consumption rate divided by the time difference between the two intervals (consumption events/time$^2$).

In an embodiment, networked media content consumption rates and changes in consumption rates can be calculated based on the delivery of media content 130 to a multiplicity of entities over a network 150 as measured by a direct measurement system 124. For example, consumption rates, and changes in consumption rates, can be calculated for unique visits, with duplicate visits from the same entity not included in the calculations. In another example, consumption rates, and changes in consumption rates, can be calculated for total visits, with all visits including duplicate visits from the same entity included in the calculations.

Consumption rates can be calculated per time interval and expressed as a rate for the whole time interval or as an average rate over the time interval. For example, for a consumption event such as a website visit, consumption rates can be represented as visits per minute as measured over a minute, average visits per hour as measured over a day, visits per weekend as measured over one weekend, average visits per weekend (as measured over a month). In another example, consumption rates can be measured over non-continuous time intervals such as the average hourly consumption rate for weekend mornings.

When detecting and/or calculating changes in consumption rates between at least two time intervals, the time intervals may be the same size, such as calculating the change in consumption rate between two consecutive Monday evenings. However, in other examples, when calculating changes in consumption rates between at least two time intervals, the time intervals are not necessarily the same size, such as calculating the change in average hourly consumption rate between a two day weekend and a five day work week.

Consumption rates, from which the consumption rate changes can be calculated, can reflect the overall consumption rate for selected media content, by counting measured consumption events by any entity for the selected media content. In another example, the consumption rate can describe the consumption rate of a subset of the selected media content's audience of entities for an interval. For example, the consumption rate can be the consumption rate based on geography (the consumption rate of entities accessing the selected media content from Los Angeles) and/or the consumption rate based on a segment of the audience (the consumption rate of a selected set of entities, the consumption rate of entities inferred to be between the ages of 18-35).

The consumption rate can describe the consumption rate of a subset of the selected media content's audience of entities for an interval, with the subset described as a list of entities. For example, an advertiser may be interested in monitoring the consumption rate changes for media content for a monitored audience of entities which have a media consumption history satisfying one or more media consumption criteria. Media consumption criteria can describe a networked media content consumption event, the context of a networked media content consumption event, networked media content and/or an entity. Examples of media consumption criteria are: completed an online purchase, completed an online registration process, been exposed to a specific set of one or more online advertisements and/or viewed an online video for at least 5 minutes with the volume on. In another example, media consumption criteria can comprise information inferred about the entity and/or consumer such as an inferred demographic profile for an entity. In another example, the consumption rate can be represented as the fraction of entities from a selected set of entities which met the media consumption criteria, and the change in consumption rate can indicate the change in this fraction.

The consumption rate can describe the consumption rate of a subset of the selected media content's audience of entities for an interval. In this example, each entity in the subset is a member of a list of entities which are similar to an archetypical audience. For example, an advertiser may be interested in monitoring the consumption rate changes for media content for an audience of entities which are similar to a known or archetypical audience. In this example, the advertiser may make a model, such as a behavioral model, to identify entities which are similar to an archetypical audience, and then use the model to select a monitored audience of entities. The system can then analyze the media consumption histories for the entities in the monitored audience to detect and report on consumption rate changes.

In another example, consumption rates and related consumption rate changes can be calculated for consumption events that meet one or more media consumption criteria such as criteria related to the context of the consumption event. In an example of media consumption criteria usage, the consumption rate can be calculated for the consumption of selected media content which was delivered to a personal computer with the volume set above a minimum volume. In another example, the consumption rate can be calculated for entities accessing the selected media content using a specific hardware device such as a certain cell phone model.

In another example, a consumption event can be a compound consumption event. Consumption rates and/or consumption rate changes can be calculated for events comprising multiple consumption events. For example, the consumption rate can be calculated for the compound consumption event comprising a first event, such as viewing a specific shoe sale webpage, and a second event, such as adding an item to an online shopping cart and receiving a pop-up window asking "Check out now or continue Shopping?" In this case, the selected media content comprises the specific shoe sale webpage and the pop-up window, taken together. In another example, a compound consumption event can comprise a first event such as receiving an exposure to online advertising content related to insurance and a second event such as requesting more information from an insurance vendor online through the insurance vendor's web interface. In this case, the selected media content comprises the advertising content and the insurance vendor's web interface.

In an example, the consumption rates for media content delivered over a network, from which the consumption rate changes can be calculated, can be standardized. For example, consumption rate can comprise the number of entities which have received selected media content within the last 10 minutes compared to the number of entities which have historically received the selected media content in an average 10 minute interval as measured by the direct tracking system in the last month. In some cases, changes in standardized consumption rates can be used to rapidly detect trends.

Selected media content can comprise individual items of media content, such as an individual web page, or sets of multiple items of media content, such as all the webpages in a website, a set of web pages from different domains on the same topic (webpages from different domains, each featuring a news story on the same subject), the set of web pages in a category of web pages (webpages from different domains providing weather forecast for San Jose), the set of networked video content featuring the same actor (identical or nearly identical previews of an upcoming movie hosted in multiple domains). In some cases, when detecting and/or calculating the consumption rate (and related consumption rate changes) of compound media content comprising multiple items of media content, the consumption of any single media content item in the compound media content counts as consumption of the compound media content.

In some embodiments of the invention, a scheduler module 108 can be configured to trigger the generator module 110 to detect and/or calculate changes in the consumption rate over specified intervals for selected media content. The scheduler module 108 can be manually, automatically, explicitly and/or implicitly configured. For example, the scheduler can be provided with a list of individual and/or compound media content consumption events associated with selected media content. This configuration would be useful for scheduling consumption rate change calculations used in providing a watch service to external systems. In an example, a watch service can comprise monitoring and reporting on specific media content for consumption rate changes and/or monitoring and reporting on changing consumption rates for specified sets of entities or subsets of an audience of entities. Consumption rates, (such as average site visits per minute measured over a two minute interval) and consumption rate changes (such as the change in consumption rate for measurements taken 10 minutes apart) can be automatically calculated for subsequent reporting.

In another example, the scheduler module 108 can be configured to trigger the generator module 110 to detect and/or calculate consumption rate changes associated with a limited number of networked media content providers. For example, the scheduler module 108 can be configured to initiate calculations related to page requests for a specific web page, set of web pages, website and/or set of websites. For example, a general configuration for seeking popular networked media content based on overall consumption can be: monitor the data repository 126 for changes in consumption rate for web pages which average more than 10,000 unique visits/day, looking at hour over hour consumption rate changes. A general configuration for seeking rapid changes in the popularity of a networked media content provider based on overall consumption can be: use the scheduler module to initiate calculations which enable the system 100 to monitor the data repository 126 for media content with more than a 25% day over day increase in the number of associated media content consumption events per day.

Export module 112 can provide reports to external systems such as receiving system 160. Examples of receiving systems include, but are not limited to, search engine indexing systems, audience selection systems for networked advertising, database systems and/or networked marketing systems. In another example, a receiving system can be an e-mail system or a web server. For example, a report may be of interest to an advertising executive and the report can be delivered to a receiving system comprising an e-mail system and/or provided to a receiving system comprising a web server where the contents may be posted as a web page.

FIG. 7, FIG. 8, FIG. 9 and FIG. 10 illustrate four example reports (reports 700, 800, 900 and 1000). For example, an export module can push information received from the scheduler module 108, such as reports including changes in media content consumption rates, to a receiving system 160 such as a search engine indexing system. A search engine indexing system can use the reports to compute or alter the indexing of selected media content. For example, a report including information which shows a dramatic increase in the media content consumption rate for selected media could be used to improve the search rank of the selected media. Similarly, a report including information which shows a dramatic decrease in the media content consumption rate for selected media could be used to decrease the search rank of the selected media or portions thereof, as it may indicate waning relevance and/or a broken link.

Export module 112 can provide reports using a push paradigm and/or responsive to requests from external resources. Reports can be individual, documenting changes for selected content individually, or compound, documenting changes for multiple selected media content. Reports can be exception reports, documenting a change in consumption rate for selected media content with a change in media content consumption rate that exceeds a predefined threshold, or they can be comprehensive, documenting changes in consumption rate for selected media content regardless of the magnitude of the increase or decrease in consumption rate. In an example, export module 112 can be configured to provide reports in response to specific requests. For example, export module 112 can interact with generator module 110 and/or scheduler module 108 to provide a report responsive to a request from a search engine indexing system based on consumption rate changes for specified media content, media content meeting specified criteria and/or media content with consumption rates that meet specified criteria.

In an example, export module 112 can be scheduled to periodically push reports to one or more receiving systems 160. For example, a receiving system 160 such as a search engine indexing system can be a subscriber to a service for receiving a report comprising a list of websites and online videos which have experienced sudden spikes in traffic. Export module 112 can access the networked media content consumption metrics generated by the generator module 110 and identify a list of URLs (Universal Resource Locators) for websites and online videos which meet predefined criteria. For example, one criterion might be "report on selected content such as webpages and online videos that have just been identified in the data repository 126 for the first time." By identifying media content with a change in consumption rate from non-existent or undefined (no entries exist in the database referring to the media content) to a measurable consumption rate, newly added or newly accessible content can be detected. Another example criterion can be "report on selected content such as online videos and websites with a minute over minute change in consumption rate of at least 25% as measured anytime in the last hour."

In an example, media content such as a web page containing a new article on an online newspaper might be of interest if it is identified in the data repository for the first time and the web page has been provided to entities at a rate exceeding 100 requests in 10 seconds. The export module 112 can send a report such as a list of references to the media content with rapidly changing consumption rates to the subscribing search engine system. A reference identifies the media content to the recipient of the report. Examples of possible references for a web page or website include, but are not limited to, a Uniform Resource Locator (URL), Uniform Resource Indicator (URI), Uniform Resource Name (URN), Namespace Identifier (NID) and/or Namespace Specific String (NSS) and/or combinations thereof. In another example, addresses, identifiers, names and/or titles can be used to identify the media content to the recipient of the report.

A search engine system may use the contents of the report to rapidly index and/or re-index the webpages in the list. Advantageously, a popular website or online video can be indicated to a search engine system very rapidly, so that they can be indexed quickly. In some examples, when a new website becomes available, the present invention can immediately provide that information to a search engine system. Furthermore, in some cases, changes in consumption rates can be provided to the search engine indexing system and the search engine system can prioritize indexing based on the popularity of the new tracked website based on the networked media content consumption metrics. Whereas an individual networked media content provider, such as a web site operator, can rapidly determine the popularity of their own webpages by monitoring their own traffic, the present invention enables a third party system, such as the reporting system 100 to rapidly determine networked media content consumption rates and rate changes for networked media content from multiple domains even if the media content is not controlled, operated and/or owned by the reporting system 100. Furthermore, a receiving system 160, such as a third party search engine indexing system, can take action, such as re-indexing, based on received reports which include information on networked media content consumption rate changes for networked media content from multiple domains even if the media content is not controlled, operated and/or owned by the third party search engine indexing system.

Referring to FIG. 7, example report 700 illustrates a listing of the three top websites which experienced the greatest increase in media content consumption rate for the measured period. In report 700, the media content representing all webpages on the designated website is identified by the URL of the landing page for the website and the consumption rate change is represented in visitors/hour/hour.

Referring to FIG. 8, example report 800 illustrates a listing of the three top webpages which experienced the greatest increase in media content consumption rate for the measured period. In report 800, the media content items are identified by a URL and the consumption rate change is represented in percentage increase per 3 hour period.

Referring to FIG. 9, example report 900 illustrates a listing of the consumption rate change for three categories of media content items, with the consumption rate change measured for the monitored audience over the measured period. In this example, the monitored audience was selected based on media content consumption history by selecting entities from the data repository which had purchased movie tickets online within the last 6 months. In report 900, the categories of media content items are identified by a string. In this example, the string identifies a list of media content items which can be looked up at the reporting system 100. The consumption rate change is represented as a factor.

Referring to FIG. 10, example report 1000 illustrates an ordered listing of the top three media content items with the greatest consumption rate change between two time intervals (8-9 AM on Dec. 25, 2009 to 8-9 AM on Jan. 1, 2010), with the consumption rate change measured for a monitored audience. The monitored audience was selected from the data repository based on similarity to the archetypical audience of entities. In report 1000, the media content items are identified by an identifier. In this example, the each identifier refers to one media content item which can be looked up at the reporting system 100. The actual values of the consumption rate changes are not included in the report.

The direct measurement system 124 and data repository 126 illustrated in FIG. 1 are co-located on the reporting system 100. However, in other examples of the invention, the direct measurement system can be partially or wholly external to the reporting system 100. In another example, the direct measurement system 124 and/or the data repository 126 can be distributed across multiple locations, domains, and/or physical systems.

Figure 3:
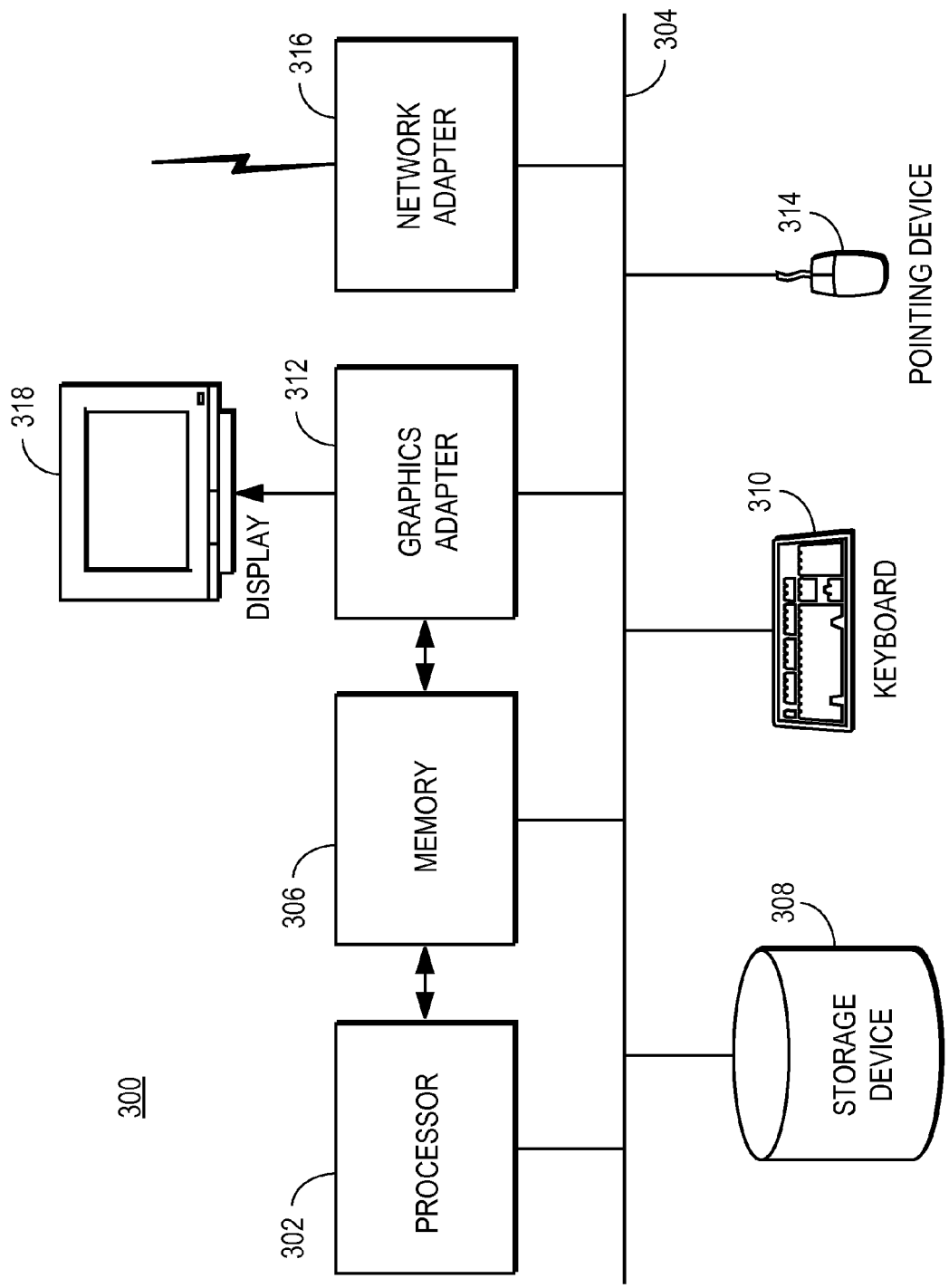
FIG. 3 is a high-level block diagram illustrating an example of a computer for use as an entity, external database, search engine indexing system, search engine system and/or reporting system of FIG. 1.

FIG. 3 is a high-level block diagram illustrating an example of a computer for use as an entity 132, external database 140, receiving system 160, search engine system 162 and/or reporting system 100 of FIG. 1. Illustrated are a processor 302 coupled to a bus 304. Also coupled to the bus 304 are a memory 306, a storage device 308, a keyboard 310, a graphics adapter 312, a pointing device 314, and a network adapter 316. A display 318 is coupled to the graphics adapter 312.

The processor 302 may be any general-purpose processor. The storage device 308 is, in one embodiment, a hard disk drive but can also be any other device capable of storing data, such as a writeable compact disk (CD) or DVD, or a solid-state memory device. The memory 306 may be, for example, firmware, read-only memory (ROM), non-volatile random access memory (NVRAM), and/or RAM, and holds instructions and data used by the processor 302. The pointing device 314 may be a mouse, track ball, or other type of pointing device, and is used in combination with the keyboard 310 to input data into the computer 300. The graphics adapter 312 displays images and other information on the display 318. The network adapter 316 couples the computer 300 to the network (not shown). In one embodiment, the network is the Internet. The network can also utilize dedicated or private communications links that are not necessarily part of the Internet.

As is known in the art, the computer 300 is adapted to execute computer program modules. As used herein, the term "module" refers to computer program logic and/or data for providing the specified functionality. A module can be implemented in hardware, firmware, and/or software. In one embodiment, the modules are stored on the storage device 308, loaded into the memory 306, and executed by the processor 302. The computer 300 is configured to perform the specific functions and operations by various modules, for example as detailed in FIG. 2, and thereby operates as a particular computer under such program control. The types of computers 300 utilized by the entities of FIG. 1 can vary depending upon the embodiment and the processing power utilized by the entity.

Figure 2:
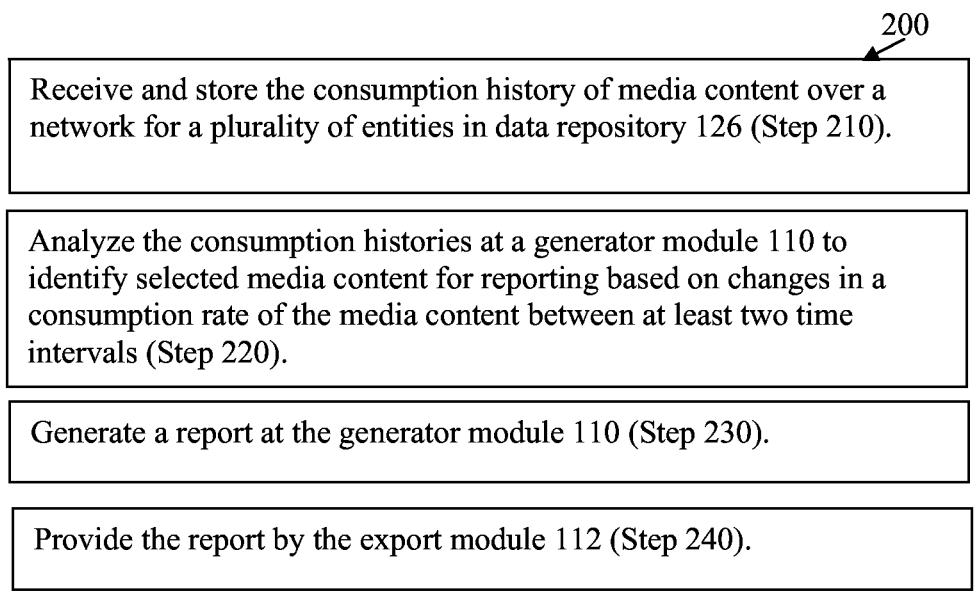
FIG. 2 is a flow chart illustrating an example of a method for reporting changes to media consumption rates according to an embodiment of the present invention.

FIG. 2 is a flow chart illustrating an example of a method 200 for providing a consumption rate change report, according to an embodiment.

Referring to Step 210, the media consumption history is received for a plurality of entities and stored in data repository 126. For example, information such as the media consumption history of media content over a network can be collected for entities using a direct measurement system 124, which can be internal to or external to the system 100. In some cases, the context of networked media content consumption events, such as the quality of the consumption event, can be part of the media consumption history.

In other examples, the media consumption history of media content over a network can be collected using other tools instead of or in conjunction with a direct measurement system. For example, in some cases, a media consumption history can be partially or wholly received from an external system such as an external database.

Information can be stored per entity. For example, identifiers such as cookies and/or unique identifiers such as locally unique identifiers and/or globally unique identifiers can be used to identify an entity. In some cases, an identifier can be composed and/or stored on a hardware device physically associated with the tracked entity, such as a cell phone or personal computer. In some cases, an identifier can be, partially or wholly, composed and/or stored on a hardware device remote from the tracked entity, such as direct measurement system 124 and/or external database 140. In some cases, attribute values can be collected from registration forms and/or cross-referenced from other sources. For example, information such as an offline purchase history can be stored in an external database 140.

In Step 220, the consumption histories are analyzed by the generator module 110 to identify selected media content for reporting based on changes in a consumption rate of the media content between at least two time intervals. In an example, a watch service can be provided for specified media content; for example, a scheduler module 108 can be configured to trigger the generator module 110 to detect and/or calculate media content consumption rate changes for specified media content. In an example, a watch service can be provided for a subset of the entities in the audience of the selected media content for each time interval; for example, a scheduler module 108 can be configured to trigger the generator module 110 to calculate media content consumption rate changes for a subset of entities such as a subset of entities selected based on inferred attributes of the entities, the media consumption histories of the entities and/or the similarity of the entities to a profile. In another example, the subset of entities used to calculate the media content consumption rate changes can be received by the system as a list of identifiers or references which correspond to entities in the data repository 126.

In Step 230, a report based at least in part on the networked media content consumption metrics is generated by the generator module 110. In some cases, the report can comprise a list of references for the most popular tracked networked media content providers and/or tracked networked media content, the newest tracked networked media content providers and/or tracked networked media content, the tracked networked media content providers and/or tracked networked media content which have the most rapidly changing audience size.

In some cases, information in the report can be provided for a subset of entities in the audience of the selected media content for each time interval. For example, a report could include a list of references to the tracked networked media content providers and/or tracked networked media content which are most popular for women viewing web pages via cellphone in the Seattle metropolitan area.

In Step 240, the export module 112 provides the report. In some cases, the report can be made available, provided, transmitted and/or updated as a continuous feed, per a schedule, and/or by request. For example, the report can be provided to an external resource such as a search engine indexing system and/or a search engine system. In another example, the report can be provided to a marketing or advertising system.

For example, the report can be used to identify networked media content for indexing and/or re-indexing by a search engine system. In some cases, the trends of interest can be used to identify media content which is of little or no interest such as dead or un-used web pages. For example, this can be used by a search engine system to exclude some search engine results. For example, a dead, broken or un-used web page might be identified by monitoring the data in the data repository for trends such as, but not limited to: media content and/or networked media content providers which have not been accessed for one year, which could be described as "a current content consumption rate of zero, and a change in consumption rate of zero over the past year."

In another example, a search engine can use the report to adjust page rank. For example, reports showing changes in popularity by day, week or month can be used to make page rank adjustments for largely static networked media content. Similarly, reports showing changes in popularity by second, minute and/or hour can be used to quickly boost the rank associated with networked media content such as urgent news stories.

In some cases, information can be obtained, collected, inferred and/or calculated from information stored in external data repositories such as external database 140. For example, an external data repository can comprise a loyalty card database tracking offline purchases. Examples of information obtained from external data repositories can include, but are not limited to, off-network purchase history, history of non-networked media content consumption such as broadcast television viewing history and/or broadcast satellite television viewing history. A variety of techniques can be used to cross-reference the information in the external data repositories to the tracked entities without maintaining sensitive information inside the current invention, such as blindfolded record linkage.

Figure 4:
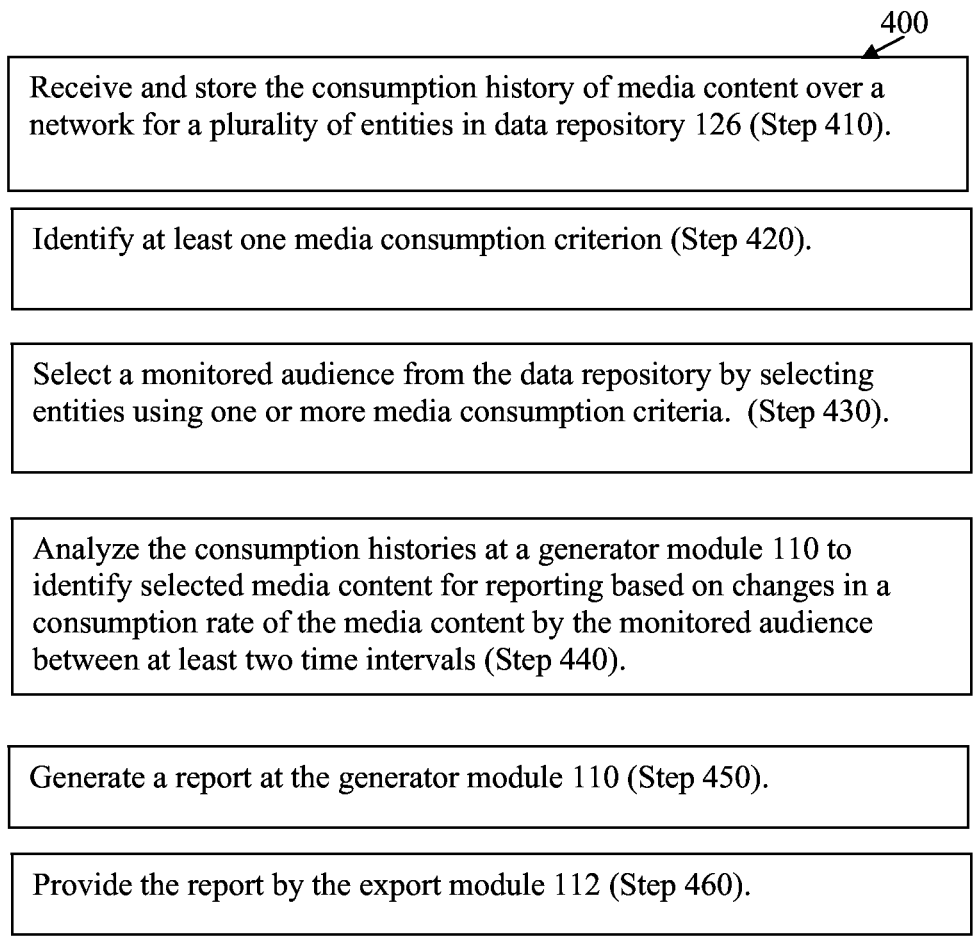
FIG. 4 is a flow chart illustrating an example of a method 400 for providing a consumption rate change report for a monitored audience, according to an embodiment.

FIG. 4 is a flow chart illustrating an example of a method 400 for providing a consumption rate change report for a monitored audience, according to an embodiment.

Referring to Step 410, the networked media content consumption history is received for a plurality of entities and stored in data repository 126.

Referring to Step 420, at least one media consumption criteria is identified. A media consumption criteria can be used to focus on a subset of entities which are interesting based on their media consumption history. For example, a marketer may be interested in reaching a target audience comprising a set of entities which have completed a registration form, but which have not completed a purchase. By specifying these two media consumption criteria, and looking for media content with a rapid change in consumption rate, the marketer may be able to identify media content which is rapidly growing in popularity with their target audience of entities.

Referring to Step 430, a monitored audience is selected from the data repository by selecting entities with a media consumption history which satisfied the media consumption criteria.

Referring to Step 440, the media consumption histories are analyzed at the reporting system 100 to identify selected media content for reporting based at least in part on the changes in consumption rate for the monitored audience.

Referring to Step 450, a report is generated by the generator module 110.

Referring to Step 460, the report is provided by the export module 112.

Figure 5:
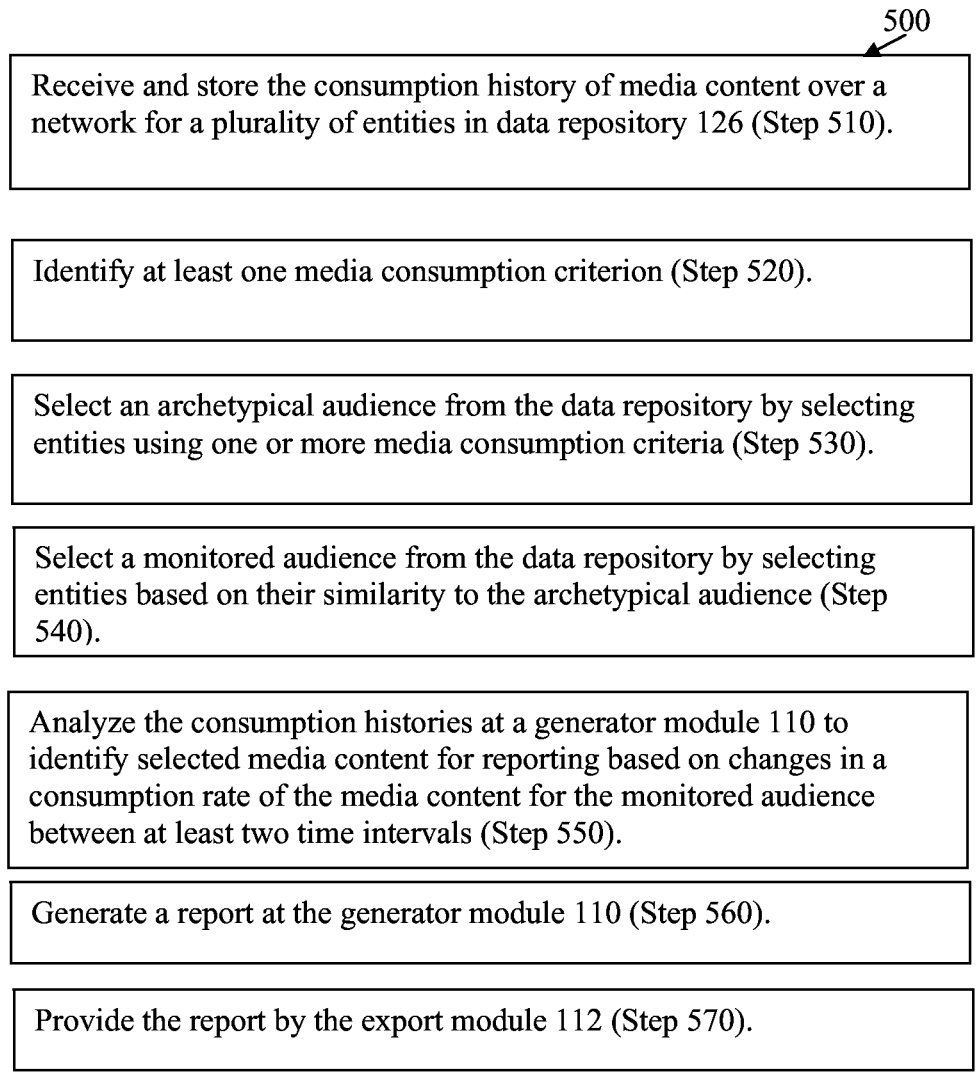
FIG. 5 is a flow chart illustrating an example of a method 500 for providing a consumption rate change report for a monitored audience which is similar to an archetypical audience, according to an embodiment.

FIG. 5 is a flow chart illustrating an example of a method 500 for providing a consumption rate change report for a monitored audience which is similar to an archetypical audience, according to an embodiment.

Referring to Step 510, the networked media content consumption history is received for a plurality of entities and stored in data repository 126.

Referring to Step 520, at least one media consumption criterion is identified.

Referring to Step 530, an archetypical audience is selected from the data repository by selecting entities with a media consumption history which satisfies the media consumption criteria.

Referring to Step 540, a monitored audience of entities is selected from the data repository based on their similarity to the archetypical audience. In an example, a behavioral model can be created using the archetypical audience as a positive training set, and the behavioral model can be applied to entities from the data repository to select the monitored audience of entities.

Referring to Step 550, the media consumption histories are analyzed at the reporting system 100 to identify selected media content for reporting based at least in part on the changes in consumption rate for the monitored audience.

Referring to Step 550, a report is generated by the generator module 110.

Referring to Step 560, the report is provided by the export module 112.

Figure 6:
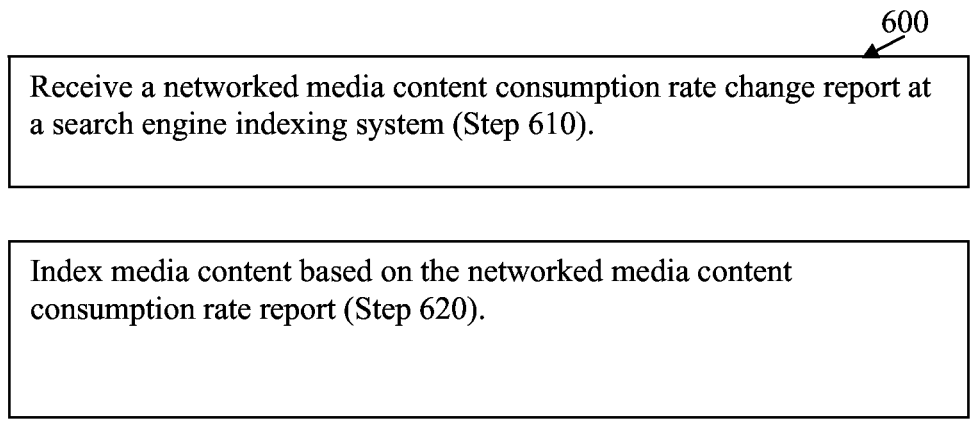
FIG. 6 is a flow chart illustrating an example of a method 600 for search-engine indexing, according to an embodiment.

FIG. 6 is a flow chart illustrating an example of a method 600 for search-engine indexing, according to an embodiment.

Referring to Step 610, a networked media content consumption rate change report is received at a search engine indexing system. In an example, a consumption rate change report can specify a list of references to media content which as experienced large consumption rate changes. In another example, a consumption rate change report can specify a list of references to media content along with the changes in consumption between at least two time intervals. In some cases, the consumption rate change can be represented as a change in the total number of consumption events per unit of time, a change in the average number of consumption events per unit of time (or per time interval), or the percentage change in the number of consumption events per unit of time (or per time interval). In some cases, rate ranges can be reported, as in "the percentage change in the number of consumption events/minute increased by 20-30%."

Referring to Step 620, media content is indexed for a search engine system based at least in part on the report. In some cases, the search engine system may re-index based on the report. However, in other examples, the results of the report can be used to make alterations to the rank of media content characterized in the report, without initiating a complete re-indexing process.

Referring to FIG. 1, an embodiment of a hardware environment for implementing the present invention includes a computer 100. However, it is understood that in other examples, a hardware environment for implementing the present invention can comprise a computing cluster, a multiplicity of computers and/or computing devices which can be persistently and/or intermittently networked via one or more wired and/or wireless networks.

The order of the steps in the foregoing described methods of the invention are not intended to limit the invention; the steps may be rearranged.

Foregoing described embodiments of the invention are provided as illustrations and descriptions. They are not intended to limit the invention to precise form described. In particular, it is contemplated that functional implementation of invention described herein may be implemented equivalently in hardware, software, firmware, and/or other available functional components or building blocks, and that networks may be wired, wireless, or a combination of wired and wireless. Other variations and embodiments are possible in light of above teachings, and it is thus intended that the scope of invention not be limited by this Detailed Description, but rather by Claims following.

What is claimed is:

1. A computer-implemented method of reporting on a measured change in a consumption rate at a reporting system, the computer-implemented method comprising:
   receiving a respective media consumption history of each of a plurality of entities;
   selecting a monitored audience from the plurality of entities by selecting entities which have been exposed to an item of advertising content;
   determining a category value for each of two or more categories of media content wherein:
      one category of media content comprises one or more items of media content;
      one category value represents the measured change in consumption rate for one category of media content for the monitored audience between at least two time intervals; and
      one consumption rate is determined based on the number of times each item of media content in the one category has been delivered over a network during one time interval, at the reporting system;
   and
   providing a report comprising a reference to two or more categories and their associated category values.

2. The method of claim 1 wherein:
   the measured change in consumption rate excludes duplicate deliveries of the item of media content to the same entity.

3. The method of claim 1 wherein:
   selecting further comprises selecting a subset of the entities with a media consumption history which satisfies one or more media consumption criteria.

4. The method of claim 1 wherein:
   selecting a monitored audience further comprises selecting entities based on inferred attributes of the entities.

5. The method of claim 1 wherein:
   the media content is a web page.

6. A system comprising:
   a processor;
   a computer readable storage medium storing processor-executable computer program instructions for reporting on a measured change in a consumption rate at a reporting system, the instructions comprising instructions for:
   receiving a respective media consumption history of each of a plurality of entities;
   selecting a monitored audience from the plurality of entities by selecting entities which have been exposed to an item of advertising content;
   determining a category value for each of two or more categories of media content wherein:
      one category of media content comprises one or more items of media content;
      one category value represents the measured change in consumption rate for one category of media content for the monitored audience between at least two time intervals; and
      one consumption rate is determined based on the number of times each item of media content in the one category has been delivered over a network during one time interval, at the reporting system;
   and
   providing a report comprising a reference to two or more categories and their associated category values.

7. The system of claim 6 wherein:
   the measured change in consumption rate excludes duplicate deliveries of the item of media content to the same entity.

8. The system of claim 6 wherein:
   selecting further comprises selecting a subset of the entities with a media consumption history which satisfies one or more media consumption criteria.

9. The system of claim 6 wherein:
   selecting a monitored audience further comprises selecting entities based on inferred attributes of the entities.

10. The system of claim 6 wherein:
    selecting a monitored audience further comprises selecting entities based on the media consumption histories of the entities.

11. The system of claim 6 wherein:
    the media content is a web page.

12. A non-transitory computer readable storage medium executing computer program instructions for reporting on measured changes in a consumption rate at a reporting system, the computer program instructions comprising instructions for:
    receiving a respective media consumption history of each of a plurality of entities;
    selecting a monitored audience from the plurality of entities by selecting entities which have been exposed to an item of advertising content;
    determining a category value for each of two or more categories of media content wherein:
       one category of media content comprises one or more items of media content;

one category value represents the measured change in consumption rate for one category of media content for the monitored audience between at least two time intervals; and one consumption rate is determined based on the number of times each item of media content in the one category has been delivered over a network during one time interval, at the reporting system;

and providing a report comprising a reference to two or more categories and their associated category values.

13. The medium of claim 12 wherein:

the measured change in consumption rate excludes duplicate deliveries of the item of media content to the same entity.

14. The medium of claim 12 wherein:

the instructions for selecting further comprise selecting a subset of the entities with a media consumption history which satisfies one or more media consumption criteria.

15. The medium of claim 12 wherein:

the instructions for selecting a monitored audience further comprise selecting entities based on inferred attributes of the entities.

16. The medium of claim 12 wherein:

the instructions for selecting a monitored audience further comprise selecting entities based on the media consumption histories of the entities.

17. The medium of claim 12 wherein:

the media content is a web page.

* * * * *